(12) United States Patent
Burugupalli et al.

(10) Patent No.: US 10,390,308 B2
(45) Date of Patent: Aug. 20, 2019

(54) MESSAGING CONTROL IN MOBILE DEVICES BASED ON SIGNAL CONDITIONS

(71) Applicant: Apple Inc., Cupertino, CA (US)

(72) Inventors: Srinivas Burugupalli, Union City, CA (US); Venkateswara Rao Manepalli, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/698,723

(22) Filed: Sep. 8, 2017

(65) Prior Publication Data

US 2019/0082393 A1   Mar. 14, 2019

(51) Int. Cl.
*H04W 52/02* (2009.01)
*H04W 8/16* (2009.01)
*H04W 48/16* (2009.01)
*H04W 24/10* (2009.01)
*H04W 28/02* (2009.01)
*H04W 76/19* (2018.01)

(52) U.S. Cl.
CPC ......... *H04W 52/0261* (2013.01); *H04W 8/16* (2013.01); *H04W 24/10* (2013.01); *H04W 28/0236* (2013.01); *H04W 48/16* (2013.01); *H04W 52/0245* (2013.01); *H04W 76/19* (2018.02)

(58) Field of Classification Search
CPC ..... H04W 76/18; H04W 76/19; H04W 76/27; H04W 60/04; H04W 76/30; H04W 76/10; H04W 36/18; H04W 76/25
USPC ............................................. 455/435.1, 437
See application file for complete search history.

(56) References Cited

U.S. PATENT DOCUMENTS 9,749,982 B2    8/2017   Hahn et al.
2013/0260810 A1*  10/2013  Rayavarapu .......... H04W 76/19
                                                          455/509
2015/0119032 A1   4/2015   Koskela et al.
2015/0207672 A1   7/2015   Xu et al.

* cited by examiner

*Primary Examiner* — Philip Sobutka
(74) *Attorney, Agent, or Firm* — Meyertons Hood Kivlin Kowert and Goetzel PC; Jeffrey C. Hood; Joel L. Stevens

(57) ABSTRACT

Systems, apparatuses, and methods for messaging improvements in link budget limited devices. A link budget limited device may be configured to suppress or delay tracking area update messages in various situations. Additionally, or alternatively, the link budget limited device may be configured to transition to idle mode instead of performing handover or recovery from radio link failure when the target base station has a signal quality less than a threshold. Additionally, or alternatively, the link budget limited device may be configured to suppress or delay measurement reports in poor signal quality conditions.

21 Claims, 8 Drawing Sheets

MESSAGING CONTROL IN MOBILE DEVICES BASED ON SIGNAL CONDITIONS

TECHNICAL FIELD

The present application relates to wireless communication, including to techniques for a wireless device to perform system recovery in accordance with one or more energy budgets.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices may take the form of smart phones or tablets that a user typically carries. Wearable devices (also referred to as accessory devices) are a newer form of mobile electronic device, one example being smart watches. Typically, wearable devices have relatively limited wireless communications capabilities and typically have smaller batteries than larger portable devices, such as smart phones and tablets. In general, it would be desirable to reduce the power requirements of communication devices. Therefore, improvements in the field are desired.

SUMMARY

Embodiments are presented herein of, inter alia, systems, apparatuses, and methods for a wireless device to perform system recovery in accordance with one or more energy budgets.

The wireless device may be a link budget limited device, such as an accessory device with a relatively limited communication range, e.g., due to device design constraints. Because of the relatively limited communication range of the wireless device, cellular communication service coverage for the wireless device may not be as widespread as for many other wireless devices, which may in turn result in the wireless device experiencing loss of cellular service or other operational and messaging issues more commonly than a wireless device with greater communication range.

Handling these various issues may be a heavily power consuming process, but battery power is also commonly a limited resource for wireless devices in general (and link budget limited devices in particular), so managing the power consumption resulting from these various operations may be desirable. Techniques for managing these operations may help support whatever balance is desired between maintaining service availability and preserving battery power/life. Such techniques may be of particular use for a wireless device that may be expected to have a cellular communication service coverage area with more frequent coverage gaps than other wireless devices, since such a wireless device may experience radio link failure and out-of-service conditions more frequently.

In one embodiment, the wireless device, such as a link budget limited device, may be configured to wirelessly communicate with a first base station. The wireless device may be configured to determine a radio link failure has occurred. The wireless device may be configured to cause the accessory device to recover communication to the network after the radio link failure; however, the wireless device may not transmit a tracking area update message upon recovering communication to the first base station after the radio link failure. In some embodiments, the decision of whether to transmit the tracking area update may be based on a battery level of the wireless device and/or whether the wireless device is recovering to the first base station or transitioning to another base station (e.g., upon performing a new cell search).

In one embodiment, the wireless device, such as a link budget limited device, may be configured to wirelessly communicate with a network while in a connected state. The wireless device may be further configured to determine a signal quality of a base station, targeted for communication by the accessory device (e.g., a current base station, such as after radio link failure, or another base station targeted for handover), is less than a signal quality threshold. The wireless device may be further configured to transition to an idle state from the connected state instead of establishing communication with the base station targeted for communication by the accessory device while in the connected state. The wireless device may be further configured to, in response to transitioning to the idle state, perform cell search for a new base station.

In one embodiment, the wireless device, such as a link budget limited device, may be configured to wirelessly communicate with a first base station. The wireless device may be further configured to determine that a measurement report condition has been triggered. The wireless device may be further configured to determine that signal conditions do not allow for transmission of a first measurement report, e.g., based on whether an ACK has been received for a prior message (e.g., a handover report) or based on comparing the signal conditions to one or more thresholds. Accordingly, the wireless device may be further configured to store the first measurement report, e.g., in a buffer, instead of attempting transmission of the first measurement report in response to determining that the signal conditions do not allow for transmission of the first measurement report. The wireless device may be configured to transmit the first measurement report when the signal conditions allow for transmission of the first measurement report. However, if there are multiple measurement reports for the first base station, including the first measurement report, the wireless device may send only the latest report for the first base station and discard the rest, including the first measurement report.

The techniques described herein may be implemented in and/or used with a number of different types of devices, including but not limited to cellular phones, tablet computers, accessory and/or wearable computing devices, portable media players, cellular base stations and other cellular network infrastructure equipment, servers, and any of various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
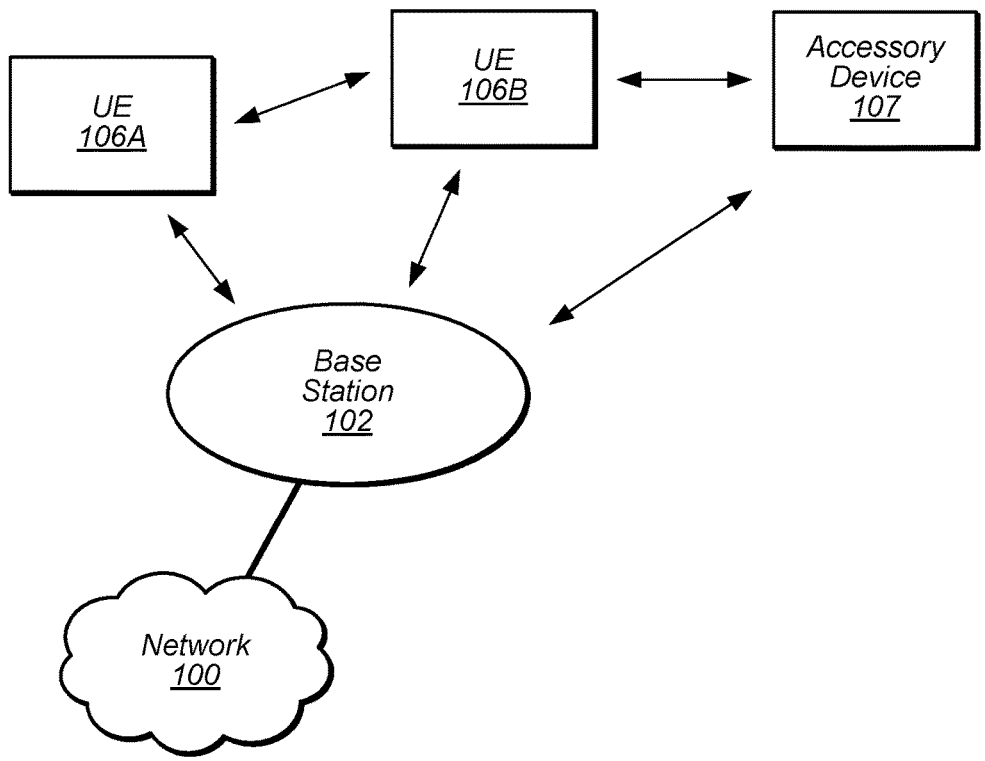
FIG. 1 illustrates an example wireless communication system including an accessory device, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terminology

The following are definitions of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer system devices which performs wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" (also called "eNB") has the full breadth of its ordinary meaning, and at least includes a wireless communication station installed at a fixed location and used to communicate as part of a wireless cellular communication system.

Link Budget Limited—includes the full breadth of its ordinary meaning, and at least includes a characteristic of a wireless device (a UE) which exhibits limited communication capabilities, or limited power, relative to a device that is not link budget limited, or relative to devices for which a radio access technology (RAT) standard has been developed. A UE that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Processing Element (or Processor)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
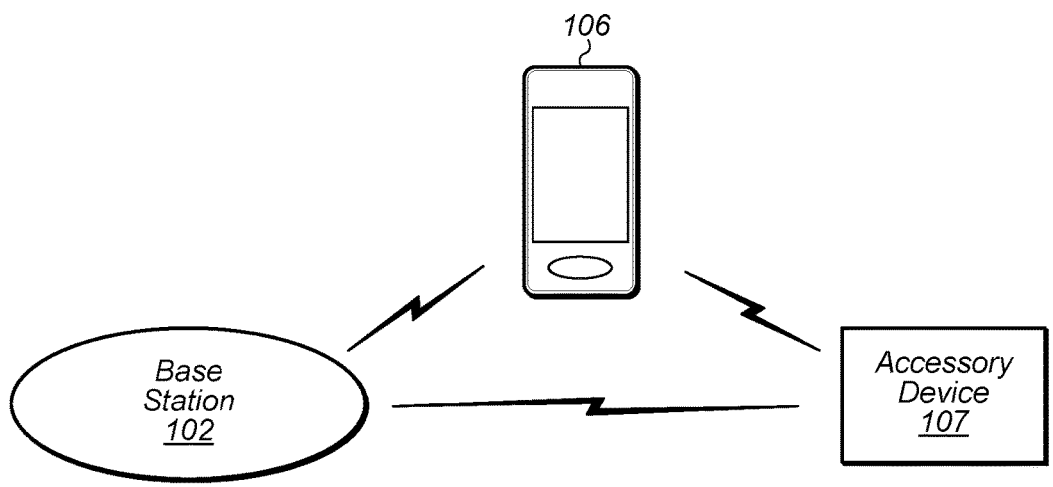
FIG. 2 illustrates an example system where an accessory device can selectively either directly communicate with a cellular base station or utilize the cellular capabilities of an intermediate or proxy device such as a smart phone, according to some embodiments.

FIGS. 1-2—Wireless Communication System

FIG. 1 illustrates an example of a wireless cellular communication system. It is noted that FIG. 1 represents one possibility among many, and that features of the present disclosure may be implemented in any of various systems, as desired. For example, embodiments described herein may be implemented in any type of wireless device. The wireless embodiment described below is one example embodiment.

As shown, the exemplary wireless communication system includes a cellular base station 102, which communicates over a transmission medium with one or more wireless devices 106A, 106B, etc., as well as accessory device 107. Wireless devices 106A, 106B, and 107 may be user devices, which may be referred to herein as "user equipment" (UE) or UE devices.

The base station 102 may be a base transceiver station (BTS) or cell site, and may include hardware that enables wireless communication with the UE devices 106A, 106B, and 107. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the UE devices 106 and 107 and/or between the UE devices 106/107 and the network 100. In other implementations, base station 102 can be configured to provide communications over one or more other wireless technologies, such as an access point supporting one or more WLAN protocols, such as 802.11 a, b, g, n, ac, ad, and/or ax, or LTE in an unlicensed band (LAA).

The communication area (or coverage area) of the base station 102 may be referred to as a "cell." The base station 102 and the UEs 106/107 may be configured to communicate over the transmission medium using any of various radio access technologies (RATs) or wireless communication technologies, such as GSM, UMTS (WCDMA, TDS-CDMA), LTE, LTE-Advanced (LTE-A), NR, HSPA, 3GPP2 CDMA2000 (e.g., 1×RTT, 1×EV-DO, HRPD, eHRPD), Wi-Fi, WiMAX etc.

Base station 102 and other similar base stations (not shown) operating according to one or more cellular communication technologies may thus be provided as a network of cells, which may provide continuous or nearly continuous overlapping service to UE devices 106A-N and 107 and similar devices over a geographic area via one or more cellular communication technologies.

Note that at least in some instances a UE device 106/107 may be capable of communicating using any of a plurality of wireless communication technologies. For example, a UE device 106/107 might be configured to communicate using one or more of GSM, UMTS, CDMA2000, WiMAX, LTE, LTE-A, NR, WLAN, Bluetooth, one or more global navigational satellite systems (GNSS, e.g., GPS or GLONASS), one and/or more mobile television broadcasting standards (e.g., ATSC-M/H), etc. Other combinations of wireless communication technologies (including more than two wireless communication technologies) are also possible. Likewise, in some instances a UE device 106/107 may be configured to communicate using only a single wireless communication technology.

The UEs 106A and 106B may include handheld devices such as smart phones or tablets, and/or may include any of various types of device with cellular communications capability. For example, one or more of the UEs 106A and 106B may be a wireless device intended for stationary or nomadic deployment such as an appliance, measurement device, control device, etc. The UE 106B may be configured to communicate with the UE device 107, which may be referred to as an accessory device 107. The accessory device 107 may be any of various types of wireless devices, typically a wearable device that has a smaller form factor, and may have limited battery, output power and/or communications abilities relative to UEs 106. As one common example, the UE 106B may be a smart phone carried by a user, and the accessory device 107 may be a smart watch worn by that same user. The UE 106B and the accessory device 107 may communicate using any of various short range communication protocols, such as Bluetooth or Wi-Fi.

The UE 106B may also be configured to communicate with the UE 106A. For example, the UE 106A and UE 106B may be capable of performing direct device-to-device (D2D) communication. The D2D communication may be supported by the cellular base station 102 (e.g., the BS 102 may facilitate discovery, among various possible forms of assistance), or may be performed in a manner unsupported by the BS 102. For example, the UE 106A and UE 106B may be capable of arranging and performing D2D communication (e.g., including D2D discovery communications) with each other even when out-of-coverage of the BS 102 and other cellular base stations.

The accessory device 107 includes cellular communication capability and hence is able to directly communicate with cellular base station 102. However, since the accessory device 107 is possibly one or more of communication, output power and/or battery limited, the accessory device 107 may in some instances selectively utilize the UE 106B as a proxy for communication purposes with the base station 102 and hence to the network 100. In other words, the accessory device 107 may selectively use the cellular communication capabilities of its companion device (e.g., UE 106B) to conduct its cellular communications. The limitation on communication abilities of the accessory device 107 can be permanent, e.g., due to limitations in output power or the radio access technologies (RATs) supported, or temporary, e.g., due to conditions such as current battery status, inability to access a network, or poor reception.

FIG. 2 illustrates an example accessory device 107 in communication with base station 102. The accessory device 107 may be a wearable device such as a smart watch. The accessory device 107 may comprise cellular communication capability and be capable of directly communicating with the base station 102 as shown. When the accessory device 107 is configured to directly communicate with the base station, the accessory device may be said to be in "autonomous mode."

The accessory device 107 may also be capable of communicating with another device (e.g., UE 106), referred to as a proxy device, intermediate device, or companion device, using a short range communications protocol; for example, the accessory device 107 may according to some embodiments be "paired" with the UE 106. Under some circumstances, the accessory device 107 may use the cellular functionality of this proxy device for communicating cellular voice/data with the base station 102. In other words, the accessory device 107 may provide voice/data packets intended for the base station 102 over the short range link to the UE 106, and the UE 106 may use its cellular functionality to transmit (or relay) this voice/data to the base station on behalf of the accessory device 107. Similarly, the voice/data packets transmitted by the base station and intended for the accessory device 107 may be received by the cellular functionality of the UE 106 and then may be relayed over the short range link to the accessory device. As noted above, the UE 106 may be a mobile phone, a tablet, or any other type of hand-held device, a media player, a computer, a laptop or virtually any type of wireless device. When the accessory device 107 is configured to indirectly communicate with the base station using the cellular functionality of an intermediate or proxy device, the accessory device may be said to be in "relay mode."

The UE 106 and/or 107 may include a device or integrated circuit for facilitating cellular communication, referred to as a cellular modem. The cellular modem may include one or more processors (processor elements) and various hardware components as described herein. The UE 106 and/or 107 may perform any of the method embodiments described herein by executing instructions on one or more programmable processors. Alternatively, or in addition, the one or more processors may be one or more programmable hardware elements such as an FPGA (field-programmable gate array), or other circuitry, that is configured to perform any of the method embodiments described herein, or any portion of any of the method embodiments described herein. The cellular modem described herein may be used in a UE device as defined herein, a wireless device as defined herein, or a communication device as defined herein. The cellular modem described herein may also be used in a base station or other similar network side device.

The UE 106 and/or 107 may include one or more antennas for communicating using two or more wireless communication protocols or radio access technologies. In some embodiments, the UE device 106/107 might be configured to communicate using a single shared radio. The shared radio may couple to a single antenna, or may couple to multiple antennas (e.g., for MIMO) for performing wireless communications. Alternatively, the UE device 106/107 may include two or more radios. Other configurations are also possible.

The accessory device 107 may be any of various types of devices that, in some embodiments, has a smaller form factor relative to a conventional smart phone, and may have one or more of limited communication capabilities, limited output power, or limited battery life relative to a conventional smart phone. As noted above, in some embodiments, the accessory device 107 is a smart watch or other type of wearable device. As another example, the accessory device 107 may be a tablet device, such as an iPad, with Wi-Fi capabilities (and possibly limited cellular communication capabilities), which is not currently near a Wi-Fi hotspot and hence is not currently able to communicate over Wi-Fi with the Internet. Thus, as defined above, the term "accessory device" refers to any of various types of devices that in some instances have limited or reduced communication capabilities and hence may selectively and opportunistically utilize the UE 106 as a proxy for communication purposes for one or more applications and/or RATs. As previously noted, when the UE 106 is capable of being used by the accessory device 107 as a proxy, the UE 106 may be referred to as a companion device to the accessory device 107.

Figure 3:
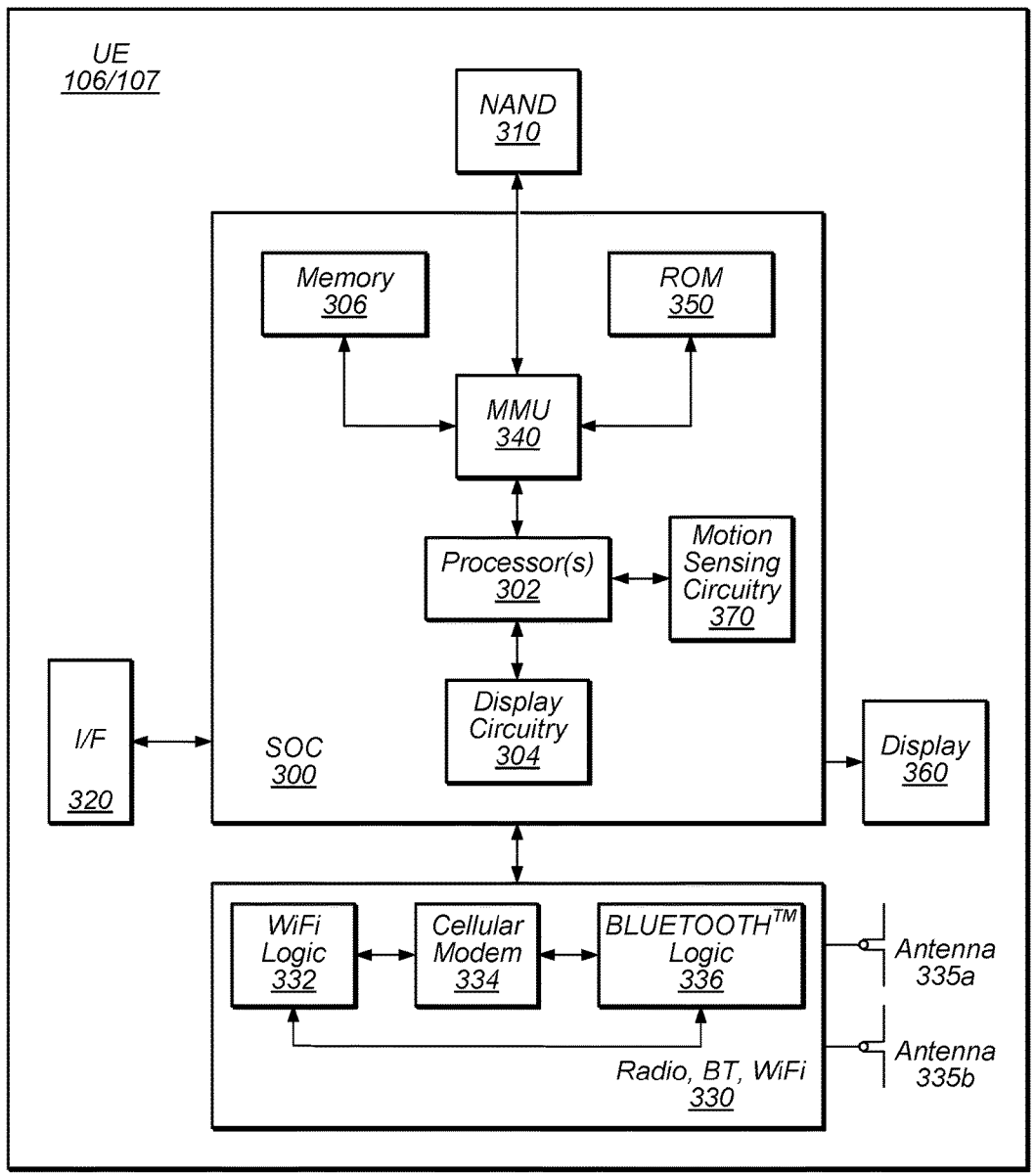
FIG. 3 is a block diagram illustrating an example wireless device, according to some embodiments.

FIG. 3—Example Block Diagram of a UE Device

FIG. 3 illustrates one possible block diagram of an UE device, such as UE device 106 or 107. As shown, the UE device 106/107 may include a system on chip (SOC) 300, which may include portions for various purposes. For example, as shown, the SOC 300 may include processor(s) 302 which may execute program instructions for the UE device 106/107, and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, flash memory 310). The MMU 340 may be configured to perform memory protection and page table translation or set up. In some embodiments, the MMU 340 may be included as a portion of the processor(s) 302.

As shown, the SOC 300 may be coupled to various other circuits of the UE 106/107. For example, the UE 106/107 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, Bluetooth, Wi-Fi, NFC, GPS, etc.).

The UE device 106/107 may include at least one antenna, and in some embodiments multiple antennas 335a and 335b, for performing wireless communication with base stations and/or other devices. For example, the UE device 106/107 may use antennas 335a and 335b to perform the wireless communication. As noted above, the UE device 106/107 may in some embodiments be configured to communicate wirelessly using a plurality of wireless communication standards or radio access technologies (RATs).

The wireless communication circuitry 330 may include Wi-Fi Logic 332, a Cellular Modem 334, and Bluetooth Logic 336. The Wi-Fi Logic 332 is for enabling the UE device 106/107 to perform Wi-Fi communications on an 802.11 network. The Bluetooth Logic 336 is for enabling the UE device 106/107 to perform Bluetooth communications. The cellular modem 334 may be a lower power cellular modem capable of performing cellular communication according to one or more cellular communication technologies.

As described herein, UE 106/107 may include hardware and software components for implementing embodiments of this disclosure. For example, one or more components of the wireless communication circuitry 330 (e.g., Wi-Fi logic 332, cellular modem 334, BT logic 336) of the UE device 106/107 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

Figure 4:
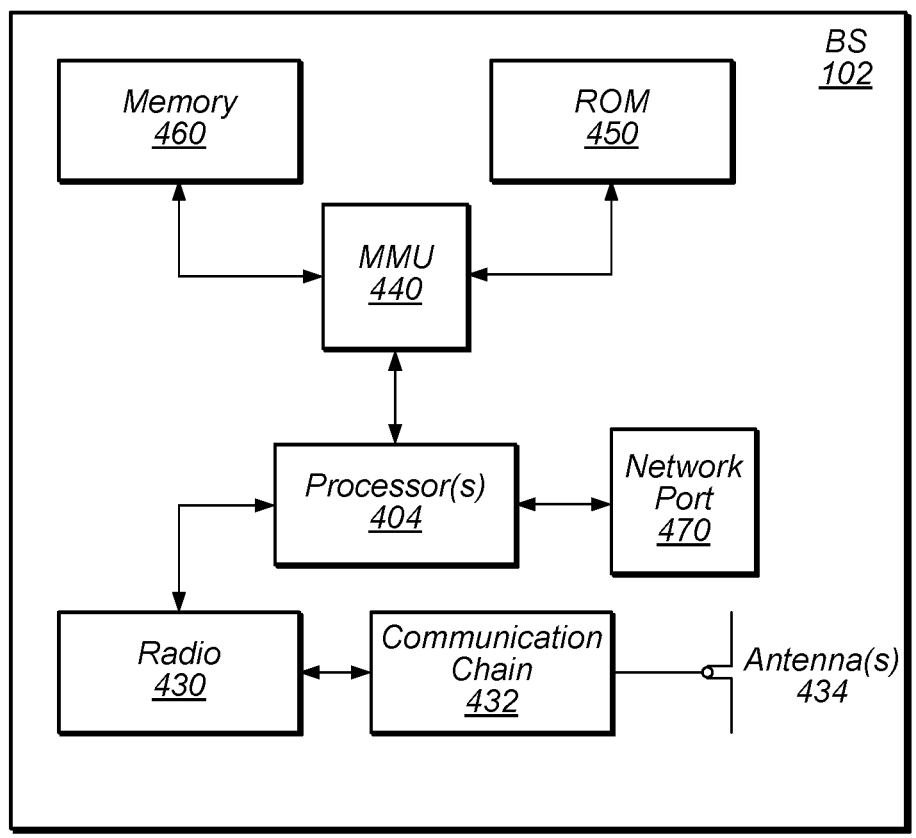
FIG. 4 is a block diagram illustrating an example base station, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106/107, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106/107. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106/107 via radio 430. The antenna(s) 434 communicates with the radio 430 via communication chain 432. Communication chain 432 may be a receive chain, a transmit chain or both. The radio 430 may be configured to communicate via various wireless communication standards, including, but not limited to, LTE, LTE-A, NR, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

Figure 5:
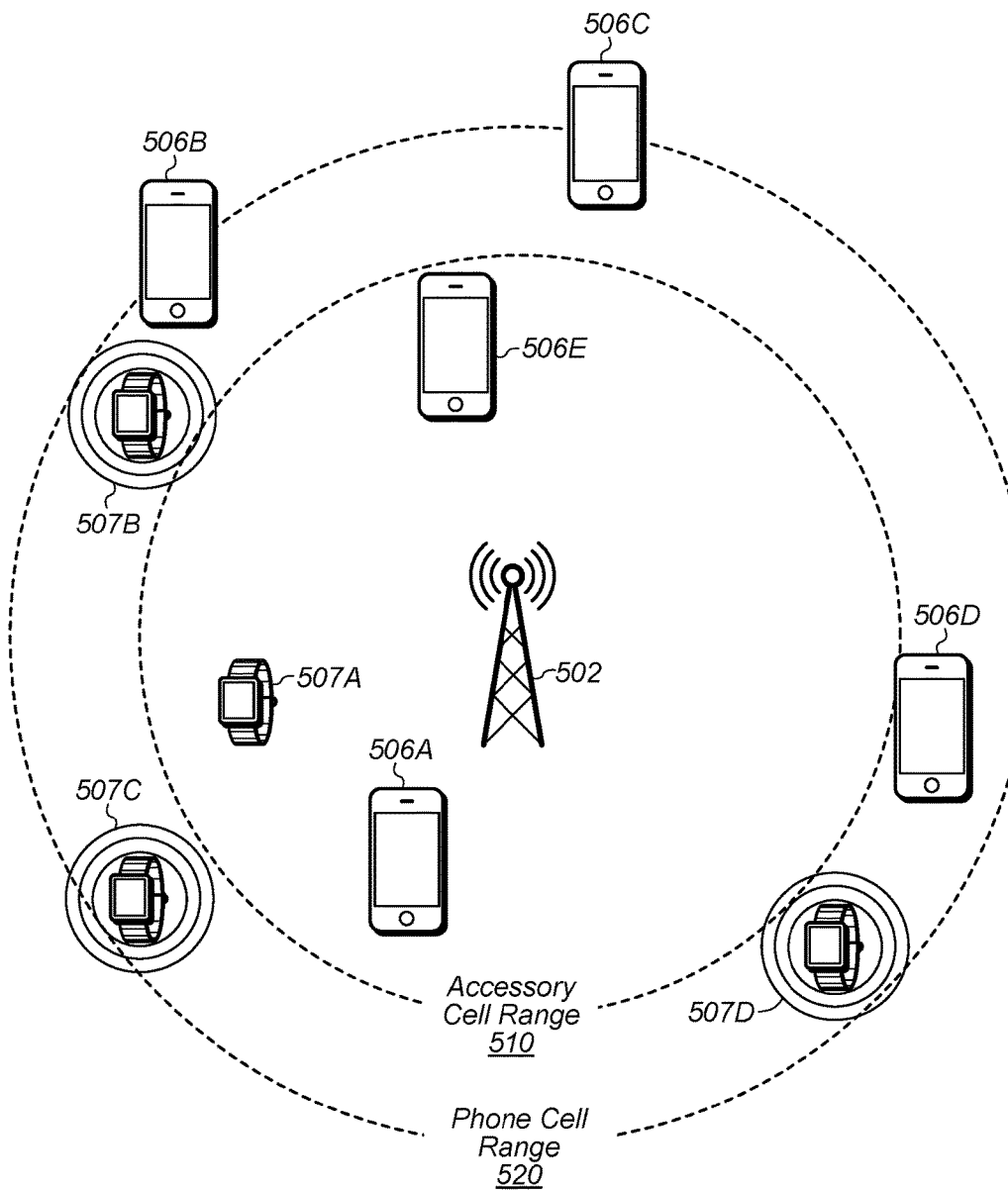
FIG. 5 illustrates a possible example coverage scenario for smartphones and smart watches, according to some embodiments.
Figure 6:
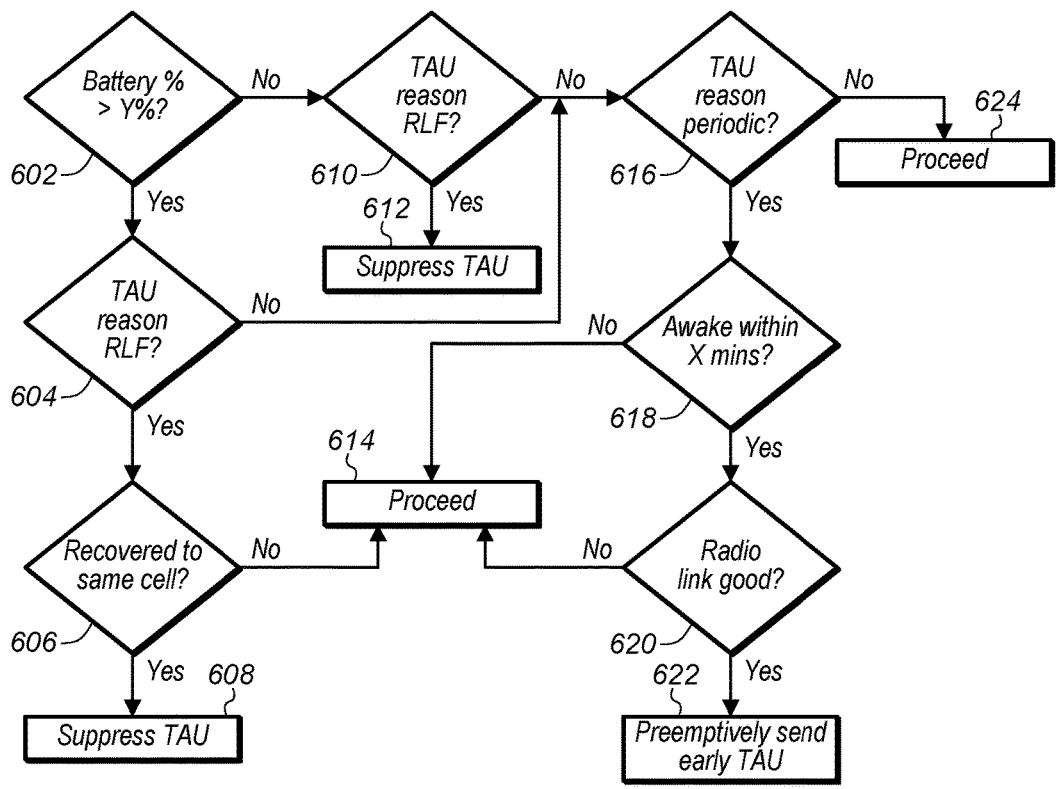
FIGS. 6-10 are flowchart diagrams illustrating exemplary methods for a wireless device to perform various messaging actions with improved power savings, according to some embodiments.

FIG. 5-6—Example Coverage Scenario and Flowchart

FIG. 5 illustrates one possible example of a coverage scenario for cell phones (e.g., smartphones) and link budget limited devices (e.g., accessory devices such as smart watches), according to some embodiments. As shown, a base station 502 may provide a cell for a variety of wireless devices, including various cell phones 506 and various link budget limited devices 507. Such different types of devices may have differing characteristics that result in different effective communication ranges. Thus, as shown, the effective link budget limited device cell range 510 may be smaller than the effective cell phone cell range 520. As a result, while all of the illustrated cell phones (506A, 506B, 506C, 506D, 506E) may be within communicative range of the base station 502 and thus may be able to receive cellular communication service from the cell, only one of the illustrated link budget limited devices (507A) may be within communicative range of the base station 502, and the remainder of the illustrated link budget limited devices (507B, 507C, 507D) may be outside of communicative range of the base station 502. Unless there are one or more other cells within range of these link budget limited devices 507B-D, they may be unable to obtain cellular communication service and may accordingly experience cellular service loss.

Thus, since cellular base station deployment may at least in some instances be arranged to provide efficient cellular communication coverage for cell phones and other devices with similar cellular communication ranges, coverage scenarios such as illustrated in FIG. 5 may result in more common radio link failure and out-of-service events for smart watches and/or other devices with smaller than average cellular communication ranges (e.g., link budget limited devices).

Due to the nature of these link budget limited devices, various problems may develop, which may involve various messaging or other cellular related activities, such as those involving tracking area updates (TAU), random access channel (RACH) procedures, radio link failure (RLF), measurements and related reports, handovers, etc.

For example, some messaging procedures like Tracking Area Updates (TAU), RACH, and RLF activity are power hungry and cause a drain in battery, particularly for battery constrained devices, such as the link budget limited devices. Additionally, these link budget limited devices are more likely to encounter scenarios involving these messaging procedures because of their communication ranges, as shown in FIG. 5 (e.g., due to limited antenna designs typically found in accessory devices, such as watches). In particular, this impaired antenna capacity may cause these messaging scenarios to consume more power on the link budget limited devices than others, such as cell phones.

As discussed in more detail below, several messaging procedures can be avoided on link budget limited devices without loss of functionality, e.g., including RLFs, TAU messaging, measurement reports, and handovers.

Figure 7:
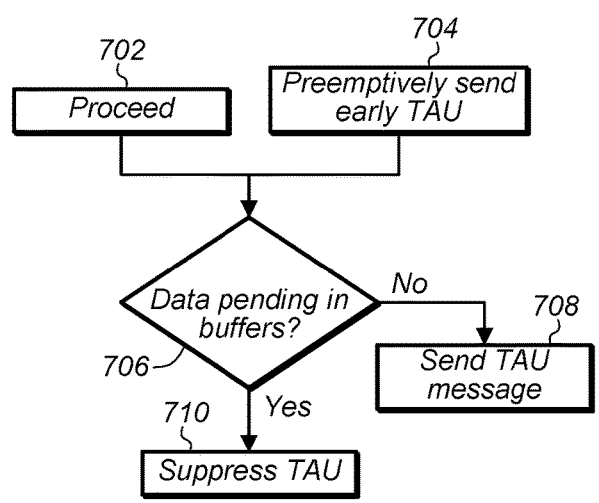

FIGS. 6 and 7—Tracking Area Updates

FIGS. 6 and 7 are flowchart diagrams illustrating methods for a wireless device (e.g., the UE 106 and/or UE 107) to handle tracking area updates during operation, according to some embodiments. Aspects of the methods of FIGS. 6 and 7 may be implemented by various devices illustrated in and described with respect to various of the Figures herein, or more generally in conjunction with any of the computer systems or devices shown in the above Figures, among other devices, as desired. In various embodiments, some of the elements of the methods shown may be performed concurrently, in a different order than shown, may be substituted for by other method elements, or may be omitted. Additional method elements may also be performed as desired.

Tracking area update (TAU) messages, sent by the UE, consume a great deal of power since they have to move the UE to online mode, start signaling and stay in connected for a period of seconds (per current standard implementations). TAU messages may generally be transmitted fairly often in various different scenarios. For example, TAU messages may be sent: when the Radio Access Technology (RAT) of the UE changes (e.g., between WCDMA and LTE, which may occur relatively more often in link budget limited devices than devices that are not); when RLF has occurred; and/or when a network configured periodic TAU timer expires (e.g., which may typically be 54 min), among other possible scenarios.

While these TAU messages consume a great deal of power, particularly for devices with limited batteries, they cannot simply be dropped—they are necessary to let the network know which tracking area the UE is in, which is needed for reliable paging. Accordingly, as discussed herein, TAU procedures may be modified where TAU messaging can be skipped or delayed without hurting the network's ability to track the UE for paging.

In some embodiments, key factors such as current battery percentage, link quality metrics, current cell ID and/or data availability in buffers may be used to determine whether to perform or delay TAU transmission. In one embodiment, if the current battery level is greater than a specified (or potentially dynamic) threshold Y %, all battery saving procedures may be skipped, but if it less than such a threshold, battery saving procedures may be implemented.

FIG. 6 illustrates one particular embodiment for performing TAU procedures. As shown in 602, the current battery percentage of the UE may be compared against the threshold Y %.

If in 602 the percentage is greater than the threshold and the reason for the TAU message is RLF (604), then the UE may determine if the UE is recovering to the same cell that it just failed on in 606. If it is, then the TAU message may be suppressed (i.e., not sent). Alternatively, if the UE has recovered to a different cell, the UE may proceed normally in 614 (e.g., sending the TAU message).

If in 602 the percentage is less than the threshold and the reason for the TAU message is RLF (610), the UE may suppress sending the TAU message in 612, regardless of whether recovery is to the same cell or not.

In either case in 602, if the reason for the TAU message is not RLF, the UE may determine if the TAU reason is periodic (e.g., based on a TAU timer) in 616. If it is not, TAU procedures may proceed normally in 624 (e.g., sending the TAU message).

Alternatively, in 618, the UE may determine if the TAU timer expires within a threshold amount of time (e.g., X minutes). If not, then the UE may proceed normally in 614 (e.g., sending the TAU message).

However, if the time does expire within the threshold amount of time, the UE may determine if the current radio link exceeds a quality threshold in 620. If it does, the UE may preemptively send an early TAU message, e.g., thereby resetting the TAU timer while a good radio link is available. On the other hand, if the radio link quality is not above the threshold, then the UE may proceed normally in 614 (e.g., continuing to wait for timer expiry). The signal quality and threshold may be measured in any of various manners, e.g., RSRP, RSCP, SINR, RSSI, etc.

FIG. 7 illustrates an additional embodiment for performing TAU procedures, e.g., which may operate in conjunction with or separately from the method of FIG. 6 (or other disclosed embodiments), as desired. In particular, the method of FIG. 7 may be invoked whenever a TAU message is scheduled to be sent. Such situations may occur from FIG. 6 such as 624, 622, or when the UE has not recovered to the same cell in 606, as indicated in 702 and 704.

In 706, e.g., before every TAU procedure initiation, the UE may query the application processor for any pending data that is yet to be sent. Accordingly, if there is uplink data pending in transmission buffers to be sent, then the UE may suppress sending the TAU message in 710, which may prevent a TAU message since the UE will go to RRC connected state anyway for data transmission (which will indicate the position of the UE to the network). However, if no data is present in the buffer, the TAU may be sent in 708.

Figure 8:
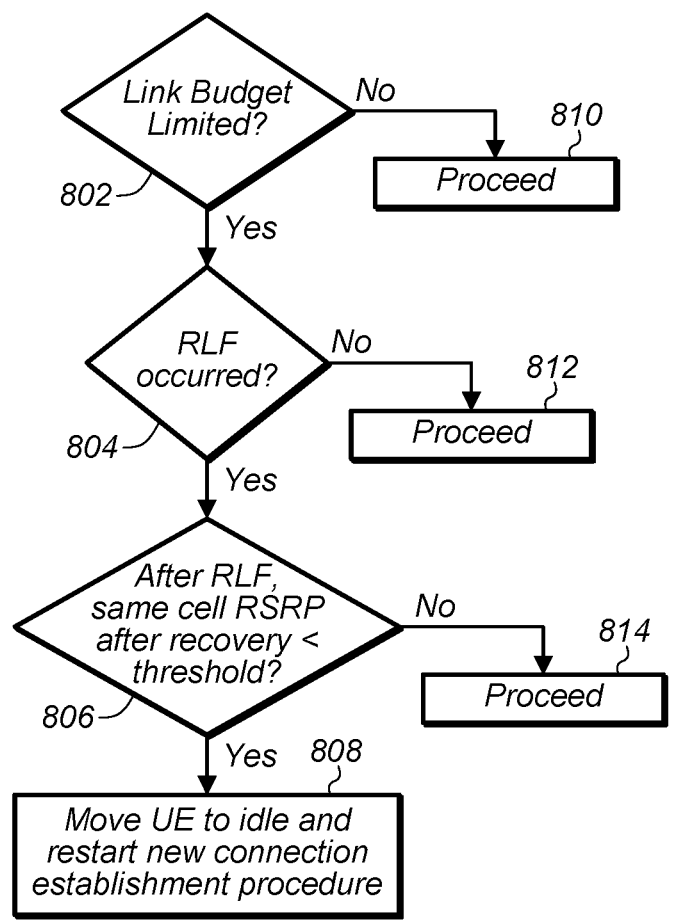

FIG. 8—Radio Link Failure

FIG. 8 is a flowchart diagram illustrating methods for a wireless device (e.g., the UE 106 and/or UE 107) to handle radio link failures during operation, according to some embodiments. Aspects of the method of FIG. 8 may be implemented by various devices illustrated in and described with respect to various of the Figures herein, or more generally in conjunction with any of the computer systems or devices shown in the above Figures, among other devices, as desired. In various embodiments, some of the elements of the methods shown may be performed concurrently, in a different order than shown, may be substituted for by other method elements, or may be omitted. Additional method elements may also be performed as desired.

RLF signaling involves RRC connection re-establishment, which generally includes many RACH transmissions even if the probability of re-establishment success is low. Additionally, even if re-establishment is successful, it will likely still be a weak cell for the UE (e.g., for link budget limited devices), which can cause battery issues as transmission power is directly proportional to the strength of the cell.

In 802, the UE may determine if it is a link budget limited UE. If it is not, then the UE may proceed with normal operations in 810 (e.g., which may respond to RLF in a typical fashion). Note that for at least some embodiments, steps 802 and 810 may not be necessary (e.g., where the software performing the procedure is only implemented on a link budget limited UE or a non-link budget limited UE, in which determining the type of UE is not necessary.

In 804, if the UE is link budget limited, the UE may determine whether a RLF has occurred. If it is not, then the UE may proceed with normal operations in 812.

When an RLF is encountered in 806, the UE may determine if the same cell signal quality is less than a threshold. The signal quality and threshold may be measured in any of various manners, e.g., RSRP, RSCP, SINR, RSSI, etc. When it is greater than the threshold, the UE may operate normally and perform connection re-establishment with the same cell in 814. However, if the signal quality is less than the threshold, rather than attempting to reconnect to that cell under re-establishment procedures, the UE may transition to an idle state and begin a new connection establishment procedure in 808.

By initiating a new connection establishment, the UE may have the opportunity to allow the UE to select the best cell or radio access technology (for example WCDMA instead of LTE), thus preventing the UE from reestablishing a connection on the same weak cell that failed in the first place and is likely to fail again, thereby causing further battery performance issues. This modification may reduce the number of RACH that will happen and unwanted signaling for re-establishment for a weak cell.

Figure 9:
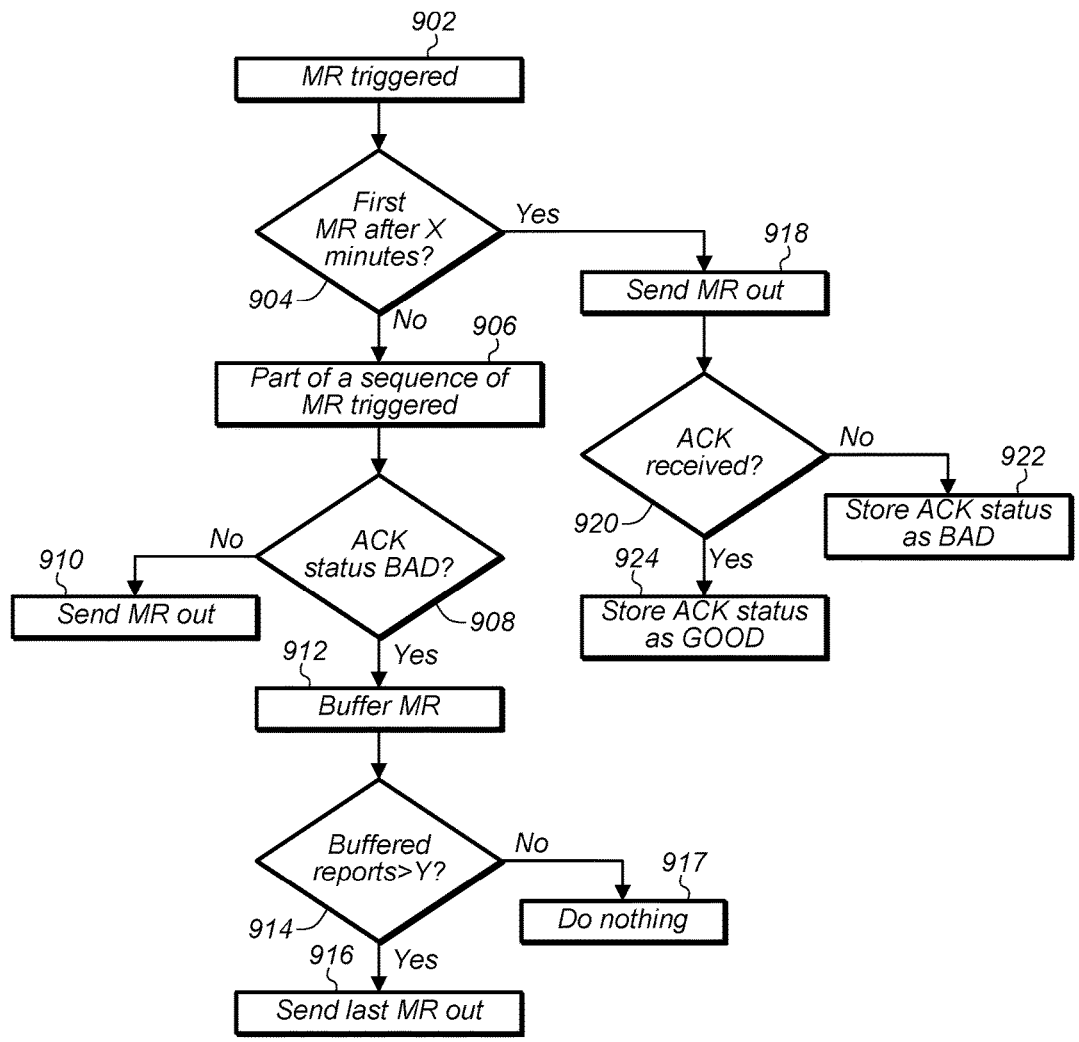

FIG. 9—Measurement Reports

FIG. 9 is a flowchart diagram illustrating methods for a wireless device (e.g., the UE 106 and/or UE 107) to handle measurement reports during operation, according to some embodiments. Aspects of the method of FIG. 9 may be implemented by various devices illustrated in and described with respect to various of the Figures herein, or more generally in conjunction with any of the computer systems or devices shown in the above Figures, among other devices, as desired. In various embodiments, some of the elements of the methods shown may be performed concurrently, in a different order than shown, may be substituted for by other method elements, or may be omitted. Additional method elements may also be performed as desired.

Measurement reports at very weak signal conditions can cause issues (e.g., in battery performance) for link budget limited devices, as the conditions may trigger too many UL transmissions/retransmissions. For example, for link budget limited devices, the situation shown in FIG. 5 may be relatively common due to the typical cell configuration of a network, which is optimized for cell phones. Accordingly, the link budget limited devices may be required to transmit measurement reports in certain conditions, such as when signal quality degrades, among other triggering conditions. Unfortunately, this reporting requires a great deal of battery power to transmit the reports when the weak signal conditions arise.

To address this situation, various embodiments may use a filtering approach, e.g., if there are multiple measurement reports (MRs) for a single base station and RAT. For example, if multiple MRs exist for a unique base station and RAT, then in certain situations (e.g., in poor channel conditions), only the latest MR may be sent. Note that there may be a plurality of MRs, each associated with a unique base station and RAT combination. Thus where there are multiple MRs for a unique base station and RAT combination, under certain conditions, only the latest may be transmitted; however, there may still be a plurality of MRs for transmission when measurement reports are generated a plurality of unique base station and RAT combinations. As a specific example, the UE may measure a first base station using a first RAT and a second base station using a second RAT, and may generate a plurality of measurement reports for both of the base stations. However, in poor signal quality conditions, the UE may discard only the latest MRM for each of the first base station and the second base station.

FIG. 9 illustrates an exemplary embodiment for handling measurement reports.

In 902, a MR may be triggered. For example, the MR may be triggered in response to various conditions, such as signal quality falling below a threshold, timers, or any other triggering condition.

In 904, the UE may determine if the MR is the first in a threshold period of time (e.g., the first MR within the last X minutes). If it is the first MR in the threshold period of time, then the UE may attempt to transmit the MR to the network in 918. If the ACK is received in 920, then the ACK status may be stored as "GOOD" in 924. Alternatively, the ACK status may be marked as "BAD" in 922, and the MR may be buffered for retransmission.

In 906, the MR may be indicated as part of a sequence of MRs that were triggered. Accordingly, in 908, the UE may determine if the ACK status is "BAD" (i.e., that an ACK was not received for an earlier MR) in 908. If the ACK status is "GOOD", then the MR may be transmitted. Alternatively, if the ACK status is "BAD", then the MR may be buffered in 912.

In 914, if there are a threshold number of buffered reports (Y), then only the last MR may be transmitted in 916. Alternatively, in 917, the MR may accumulate in the buffer.

The method shown in FIG. 9 may be modified in various ways, among other possibilities. For example, the ACK status may be replaced or augmented with a signal quality threshold comparison (e.g., where MRs are sent when the signal quality is above a threshold). In addition, the determination of when to send the last MR may be based on the signal quality exceeding a threshold (e.g., augmenting or replacing the comparison of the number of buffered reports to a threshold in 914).

Additionally, or alternatively, multiple MRs (e.g., each corresponding to a unique base station/RAT pair) may be transmitted when an MR has been successfully transmitted (e.g., when an ACK is received) and/or when signal quality improves. For example, in one embodiment, there may be a unique upload queue for each unique base station/RAT pair, and the UE may store only the latest MR in each queue in "BAD" conditions. The UE may then transmit all of the MRs in the plurality of queues once signal conditions improve and/or an MR is successfully ACKed.

FIG. 10—Handover

Figure 10:
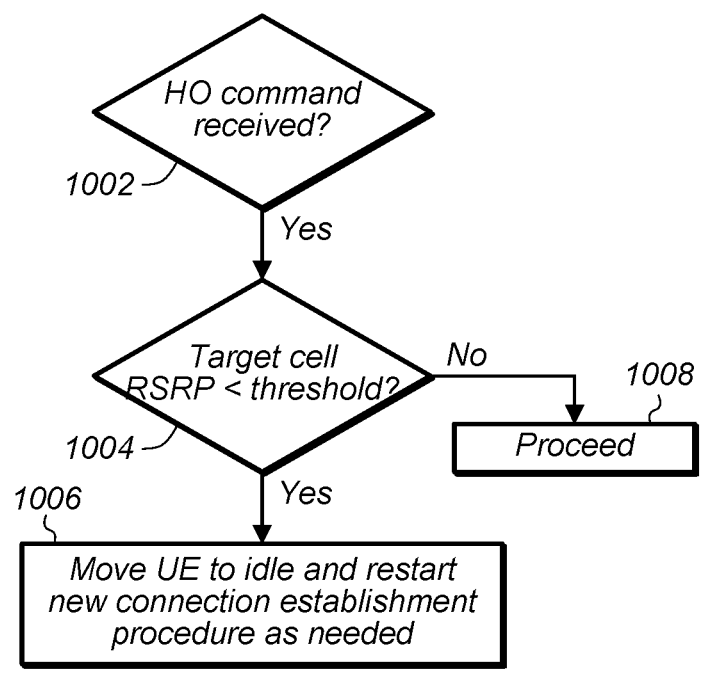

FIG. 10 is a flowchart diagram illustrating methods for a wireless device (e.g., the UE 106 and/or UE 107) to handle handover during operation, according to some embodiments. Aspects of the method of FIG. 10 may be implemented by various devices illustrated in and described with respect to various of the Figures herein, or more generally in conjunction with any of the computer systems or devices shown in the above Figures, among other devices, as desired. In various embodiments, some of the elements of the methods shown may be performed concurrently, in a different order than shown, may be substituted for by other method elements, or may be omitted. Additional method elements may also be performed as desired.

Handover (HO) is sometimes triggered and the UE (e.g., the link-budget limited device) may end up camping on a weak cell, which can cause significant power drain for the UE. As one example, MRs may be triggered when serving cell falls below a threshold. Then, if event A3 is satisfied (when a neighboring cell becomes an offset better than the serving cell), the network may request the UE to perform a handover. Unfortunately, it is possible for the UE to successfully send an MR even at −131 dBm and receive a handover command, e.g., to a neighboring base station with a an RSRP ƒ125 dbm, thus resulting in the UE camping on a weak cell. Such situations may be more common for link budget limited devices than those that are not. Accordingly, rather than handing over to a weak cell, the UE may be configured to transition to idle mode instead based on a signal quality threshold.

FIG. 10 illustrates an exemplary embodiment for handling handover, e.g., for a link budget limited device.

In 1002, a HO command may be received.

In 1004, the UE may compare the signal quality of the target cell to a threshold (e.g., RSRP among other possible signal metrics, such as RSCP, RSSI, SINR, etc.).

In 1008, if the target cell signal quality is greater than the signal quality threshold, the UE may proceed with handover.

However, if the target cell signal quality is less than the threshold, in 1006, the UE may transition to idle mode and possibly initiate a new connection establishment procedure, e.g., allowing the UE to search for the best available cell for the UE.

Exemplary Embodiments

The following paragraphs describe various exemplary embodiments for implementing improvements in UE (e.g., link budget limited devices) operation and/or messaging. Each of the paragraphs may be implemented as systems, apparatuses, devices, methods, memory mediums, programs, etc., as desired.

In one embodiment, an apparatus, e.g., for inclusion in an accessory device, such as a link budget limited device, may include a processing element configured to cause an accessory device to wirelessly communicate with a first base station. The processing element may be further configured to cause the accessory device to determine a radio link failure has occurred. The processing element may be further configured to cause the accessory device to recover communication to the network after the radio link failure; however, the accessory device may not transmit a tracking area update message upon recovering communication to the first base station after the radio link failure.

In one embodiment, the accessory device may be configured to transmit a tracking area update message when recovering communication with a different base station than the first base station.

In one embodiment, the processing element is further configured to cause the accessory device to: determine a battery level and compare the battery level to a threshold. The accessory device may be configured to only transmit the tracking area update message when recovering communication with a different base station than the first base station and when the battery level exceeds the threshold. Alternatively, in one embodiment, when the battery level does not exceed the threshold, the accessory device may not transmit the tracking area update message upon recovery.

In one embodiment, the processing element is configured to cause the accessory device to: determine to send a tracking area update message and determine that pending data will be transmitted by the accessory device, e.g., data may be buffered for transmission by one or more applications executing on the accessory device. In response to determining that pending data will be transmitted by the accessory device, the processing element may be configured to cause the accessory device to suspend transmission of the tracking area update message.

In one embodiment, the processing element is configured to cause the accessory device to determine that a tracking area update timer expires in less than a threshold period of time and determine that current signal quality is greater than a threshold quality level. Accordingly, the processing element may be configured to cause the accessory device to transmit a tracking area update message in response to determining that the tracking area update timer expires in less than the threshold period of time and that the current signal quality is greater than the threshold quality level. In particular, the tracking area update message may be sent prior to expiry of the timer based on the signal quality level being good (e.g., one or more minutes prior to expiry).

In one embodiment, an apparatus, e.g., for inclusion in an accessory device, such as a link budget limited device, may include a processing element configured to cause an accessory device to wirelessly communicate with a network while in a connected state. The processing element may further cause the accessory device to determine a signal quality of a base station, targeted for communication by the accessory device, is less than a signal quality threshold. The processing element may further cause the accessory device to transition to an idle state from the connected state instead of establishing communication with the base station targeted for communication by the accessory device while in the connected state. The processing element may further cause the accessory device to, in response to transitioning to the idle state, perform cell search for a new base station.

In one embodiment, wirelessly communicating with the network may include wirelessly communicating with a first base station, which is the base station targeted for communication by the accessory device. Additionally, the accessory device may experience radio link failure with respect to the first base station prior to determining the signal quality of the first base station is less than the signal quality threshold. Accordingly, the accessory device may be configured to search for the new base station instead of re-establishing communication with the first base station in response to the signal quality being less than the signal quality threshold.

In one embodiment, wirelessly communicating with the network comprises wirelessly communicating with a first base station, but the base station targeted for communication by the accessory device is a second base station targeted for handover from the first base station. Accordingly, the accessory device may be configured to search for the new base station instead of establishing communication with the second base station in response to the signal quality of the second base station being less than the signal quality threshold.

In one embodiment, both the first base station and the second base station have signal quality levels less than the signal quality threshold (e.g., when the second base station signal quality is better than the first base station signal quality, but is still less than the signal quality threshold).

In one embodiment, an apparatus, e.g., for inclusion in an accessory device, such as a link budget limited device, may include a processing element configured to cause an accessory device to wirelessly communicate with a first base station. The processing element may be further configured to cause the accessory device to determine that a measurement report condition has been triggered. The processing element may be further configured to cause the accessory device to determine that signal conditions do not allow for transmission of a first measurement report. Accordingly, the processing element may be further configured to cause the accessory device to store the first measurement report, e.g., in a buffer, instead of attempting transmission of the first measurement report in response to determining that the signal conditions do not allow for transmission of the first measurement report.

In one embodiment, determining that signal conditions do not allow for transmission of the measurement report may include determining that an ACK has not been received for a prior transmitted measurement report.

In one embodiment, determining that signal conditions do not allow for transmission of the measurement report may include determining that a signal quality of the first base station is less than a signal quality threshold.

In one embodiment, the processing element is configured to cause the accessory device to transmit the first measurement report when the signal conditions allow for transmission of the first measurement report.

In one embodiment, the processing element is further configured to cause the accessory device to buffer a plurality of measurement reports, including the first measurement report. The processing element may be further configured to cause the accessory device to determine, at a later time, that signal conditions allow for transmission of the plurality of measurement reports. The processing element may be further configured to cause the accessory device to discard one or more measurement reports, including the first measurement report, from the buffer. The processing element may be further configured to cause the accessory device to transmit a latest measurement report in response to determining that signal conditions allow for transmission of the plurality of measurement reports.

In one embodiment, the latest measurement report may be associated with the first base station. Additionally, discarding the one or more measurement reports may include discarding all previous measurement reports associated with the first base station, including the first measurement report.

In one embodiment, the processing element is further configured to cause an accessory device to transmit all latest measurement reports for each unique base station and radio access technology pair based on determining that signal conditions allow for transmission of the plurality of measurement reports.

In one embodiment, the processing element is further configured to cause an accessory device to compare the number of measurement reports in the buffer to a threshold and transmit a latest measurement report in the buffer when the number of measurement reports in the buffer exceeds the threshold.

In addition to the above-described exemplary embodiments, further embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106 or 107) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
a processor configured to cause an accessory device to:
 wirelessly communicate with a first base station associated with a network;
 determine a radio link failure has occurred;
 determine a battery level;
 compare the battery level to a threshold;
 recover communication to the network after the radio link failure, wherein the accessory device does not transmit a tracking area update message upon recovering communication to the first base station after the radio link failure, wherein the accessory device does not transmit a tracking area update message upon recovering communication with a different base station than the first base station when the battery level is below the threshold, and wherein the accessory device is configured to transmit the tracking area update message when recovering with the different base station and when the battery level is above the threshold.

2. The apparatus of claim 1, wherein the accessory device comprises a link budget limited device.

3. An apparatus, comprising:
a processor configured to cause an accessory device to:
wirelessly communicate with a first base station of a network while in a connected state;
determine a signal quality of a second base station, targeted for handover from the first base station by the accessory device, is less than a signal quality threshold;
based on the signal quality of the second base station being less than the signal quality threshold:
transition to an idle state from the connected state instead of establishing communication with the second base station targeted for handover by the accessory device while in the connected state; and
in response to transitioning to the idle state, perform cell search for a new base station.

4. The apparatus of claim 3, wherein both the first base station and the second base station have signal quality levels less than the signal quality threshold.

5. The apparatus of claim 3, wherein the accessory device comprises a link budget limited device.

6. An apparatus, comprising:
a processor configured to cause an accessory device to:
wirelessly communicate with a first base station;
determine that a measurement report condition has been triggered;
determine that signal conditions do not allow for transmission of a first measurement report;
store the first measurement report in a buffer instead of attempting transmission of the first measurement report in response to determining that the signal conditions do not allow for transmission of the first measurement report;
compare the number of measurement reports in the buffer to a threshold; and
transmit a latest measurement report in the buffer when the number of measurement reports in the buffer exceeds the threshold.

7. The apparatus of claim 6, wherein determining that signal conditions do not allow for transmission of the measurement report comprise determining that an ACK has not been received for a prior transmitted measurement report.

8. The apparatus of claim 6, wherein determining that signal conditions do not allow for transmission of the measurement report comprises determining that a signal quality of the first base station is less than a signal quality threshold.

9. The apparatus of claim 6, wherein transmitting the latest measurement report is performed when the signal conditions allow for transmission of the latest measurement report.

10. The apparatus of claim 6, wherein the accessory device comprises a link budget limited device.

11. The apparatus of claim 6, wherein said transmitting the latest measurement report comprises transmitting all latest measurement reports for each unique base station.

12. The apparatus of claim 1, wherein the processor is further configured to cause the accessory device to:
determine that pending data will be transmitted by the accessory device; and
in response to determining that pending data will be transmitted by the accessory device, suspend transmission of the tracking area update message.

13. An apparatus, comprising:
a processor configured to cause an accessory device to:
wirelessly communicate with a first base station;
determine that a measurement report condition has been triggered;
determine that signal conditions do not allow for transmission of a first measurement report;
store the first measurement report in a buffer instead of attempting transmission of the first measurement report in response to determining that the signal conditions do not allow for transmission of the first measurement report;
store one or more additional measurement reports in the buffer, wherein a plurality of measurement reports are stored in the buffer including the first measurement report;
determine, at a later time, that signal conditions allow for transmission of the plurality of measurement reports;
discard one or more measurement reports, including the first measurement report, from the buffer; and
transmit a latest measurement report in response to determining that signal conditions allow for transmission of the plurality of measurement reports.

14. The apparatus of claim 13, wherein the latest measurement report is associated with the first base station, wherein discarding the one or more measurement reports comprises discarding all previous measurement reports associated with the first base station, including the first measurement report.

15. The apparatus of claim 13, wherein said transmitting the latest measurement report includes:
transmitting all latest measurement reports for each unique base station.

16. The apparatus of claim 13, wherein the processor is further configured to cause the accessory device to:
transmit all latest measurement reports for each unique base station and radio access technology pair based on determining that signal conditions allow for transmission of the plurality of measurement reports.

17. An apparatus, comprising:
a processor configured to cause an accessory device to:
wirelessly communicate with a first base station;
determine that a tracking area update timer expires in less than a threshold period of time;
determine that current signal quality is greater than a threshold quality level;
before expiry of the tracking area update timer, determine to transmit a tracking area update message in response to determining that the tracking area update timer expires in less than the threshold period of time and that the current signal quality is greater than the threshold quality level.

18. The apparatus of claim 17, wherein the processor is further configured to cause the accessory device to:
determine that pending data will be transmitted by the accessory device; and
in response to determining that pending data will be transmitted by the accessory device, suspend transmission of the tracking area update message.

19. An apparatus, comprising:
a processor configured to cause an accessory device to:
wirelessly communicate with a first base station;
determine a radio link failure has occurred;

determine to transmit a tracking area update message;

determine that pending data will be transmitted by the accessory device; and in response to determining that pending data will be transmitted by the accessory device, suspend transmission of the tracking area update message.

20. The apparatus of claim 19, wherein determining to transmit the tracking area update message is performed in response to determining the radio link failure.

21. The apparatus of claim 19, wherein determining to transmit the tracking area update message is performed in response to determining that a tracking area update timer will expire.

* * * * *